United States Patent
Shiraki et al.

(10) Patent No.: US 11,757,315 B2
(45) Date of Patent: Sep. 12, 2023

(54) ROTOR AND BRUSHLESS MOTOR

(71) Applicant: MABUCHI MOTOR CO., LTD., Chiba (JP)

(72) Inventors: Kenji Shiraki, Chiba (JP); Katsuhito Nishizawa, Chiba (JP); Shou Kubota, Chiba (JP); Yuhei Ito, Chiba (JP)

(73) Assignee: MABUCHI MOTOR CO., LTD., Chiba (JP)

(*) Notice: Subject to any disclaimer, the term of this patent is extended or adjusted under 35 U.S.C. 154(b) by 70 days.

(21) Appl. No.: 17/458,546

(22) Filed: Aug. 27, 2021

(65) Prior Publication Data
US 2022/0069650 A1    Mar. 3, 2022

(30) Foreign Application Priority Data
Aug. 31, 2020   (JP) .................................. 2020-146429

(51) Int. Cl.
| | |
|---|---|
| *H02K 1/00* | (2006.01) |
| *H02K 1/2726* | (2022.01) |
| *H02K 11/215* | (2016.01) |
| *H02K 1/28* | (2006.01) |

(52) U.S. Cl.
CPC ............. *H02K 1/2726* (2013.01); *H02K 1/28* (2013.01); *H02K 11/215* (2016.01)

(58) Field of Classification Search
CPC ...... H02K 1/2726; H02K 1/28; H02K 11/215; H02K 5/08; H02K 2211/03; H02K 5/225; H02K 5/15; H02K 1/2733; H02K 15/03
See application file for complete search history.

(56) References Cited

U.S. PATENT DOCUMENTS

| | | | | |
|---|---|---|---|---|
| 2002/0145359 | A1* | 10/2002 | Nishiyama | H02K 15/022 310/216.065 |
| 2012/0025746 | A1* | 2/2012 | Kawakubo | H02K 11/33 29/596 |
| 2015/0008778 | A1* | 1/2015 | Dharan | B21J 1/06 74/572.11 |
| 2015/0295476 | A1* | 10/2015 | Miyajima | H02K 11/215 310/68 B |

FOREIGN PATENT DOCUMENTS

| | | | |
|---|---|---|---|
| JP | 2019146427 A | * | 8/2019 |
| JP | 2019146427 A | | 8/2019 |

OTHER PUBLICATIONS

JP H10174327 (Year: 1998).*

* cited by examiner

*Primary Examiner* — Quyen P Leung
*Assistant Examiner* — Elrasheed E. B. Hamdan
(74) *Attorney, Agent, or Firm* — HAUPTMAN HAM, LLP (57) ABSTRACT

A rotor applied to an inner rotor brushless motor includes: a rotor core having a laminate of a plurality of annular thin plate-shaped core pieces, the rotor core being configured to rotate together with a shaft in an integrated manner; a cylindrical resin magnet mounted on an outer peripheral surface of the rotor core via a gap; a groove-shaped adhesive admission portion in a straight line along the entire length of the rotor core in an axial direction thereof, the adhesive admission portion being recessed into the outer peripheral surface of the rotor core; and an adhesive configured to bond and fix the rotor core and the magnet. The adhesive is filled in an entire adhesive allowance having both of the gap and the adhesive admission portion between the outer peripheral surface of the rotor core and an inner peripheral surface of the magnet.

5 Claims, 7 Drawing Sheets

ROTOR AND BRUSHLESS MOTOR

RELATED APPLICATIONS

The present application claims priority to Japanese Application No. 2020-146429 filed Aug. 31, 2020, the disclosure of which is hereby incorporated by reference herein in its entirety.

BACKGROUND

1. Technical Field

The embodiments disclosed herein relate to a rotor and a brushless motor, which are applied to an inner rotor brushless motor.

2. Description of the Related Art

In an inner rotor brushless motor, a rotor including a magnet is placed in the center of a stator including coils, and an output is taken out of a shaft that rotates together with the rotor in an integrated manner. The rotor is configured by fixing the magnet to an outer peripheral surface of a rotor core obtained by laminating annular thin plate core pieces in an axial direction. Moreover, a rotor has also been proposed in which the rotor is integrated with a shaft, and a part of the shaft is formed with a larger diameter than both ends thereof and provided as a "magnet mounting portion" as in JP-A-2019-146427. In a motor of JP-A-2019-146427, the magnet mounting portion and a ring magnet are fixed via an adhesive.

In a general bonding method, an adhesive with relatively high viscosity is used to level off the adhesive between bonding target objects to fill a gap and bond the target objects together. However, this bonding method has a problem that in a case of a rotor having a thick laminate, the adhesive is not applied uniformly between the rotor core and the quality of the rotor becomes unstable. Especially, if the material of the rotor core and the material of the magnet are different (for example, if the metal rotor core and the resin magnet are bonded together), nonuniform application may result in a fracture or a crack caused due to a difference between the thermal coefficients of expansion of the rotor core and the magnet during high-speed rotation of the rotor or thermal expansion and contraction.

Moreover, in the motor of JP-A-2019-146427 described above, a plurality of adhesive grooves is provided in an outer peripheral surface of the magnet mounting portion. Part of a large amount of the adhesive applied to the outer peripheral surface of the magnet mounting portion becomes embedded in the adhesive grooves. Accordingly, the spill of the adhesive is prevented, and the bonding strength is increased. However, in the configuration of JP-A-2019-146427, the adhesive is applied to the outer peripheral surface of the magnet mounting portion and then the ring magnet is mounted. Accordingly, the adhesive applied to the outer peripheral surface of the magnet mounting portion may be scraped by an inner peripheral surface of the ring magnet. It is not always possible to apply the adhesive uniformly to the entire outer peripheral surface.

The embodiments have been devised considering such a problem, and one object thereof is to provide a rotor and brushless motor with a simple configuration which, even in a case of a rotor having a thick laminate, achieves avoidance of nonuniform adhesive application and an increase in quality. The object is not limited to this. Another object of the embodiments is to exert operation and effects derived from configurations illustrated in description of the embodiments described below, which cannot be obtained by the known technology.

SUMMARY (1) A rotor disclosed herein is a rotor applied to an inner rotor brushless motor including: a rotor core having a laminate of a plurality of annular thin plate-shaped core pieces, the rotor core being configured to rotate together with a shaft in an integrated manner; a cylindrical resin magnet mounted on an outer peripheral surface of the rotor core via a gap; a groove-shaped adhesive admission portion in a straight line along the entire length of the rotor core in an axial direction thereof, the adhesive admission portion being recessed into the outer peripheral surface of the rotor core; and an adhesive configured to bond and fix the rotor core and the magnet. The adhesive is filled in an entire adhesive allowance having both of the gap and the adhesive admission portion between the outer peripheral surface of the rotor core and an inner peripheral surface of the magnet.

(2) Preferably, a plurality of the adhesive admission portions is spaced uniformly in a circumferential direction of the rotor core.

(3) Preferably, the core piece is produced by press blanking, and the thickness of the laminate of the rotor core is equal to or greater than 10 mm and equal to or less than 40 mm.

(4) Preferably, the rotor further includes: a bush fixed to the rotor core and the magnet on one end side in the axial direction; and a sensor magnet fixed to the bush on the one end side, the sensor magnet being configured to rotate together with the shaft in an integrated manner. In this case, preferably, the bush has a prevention surface that blocks the gap on the one end side to prevent run-off of the adhesive, and a holding portion that holds the sensor magnet.

(5) Preferably, the viscosity of the adhesive is equal to or greater than the viscosity of water and equal to or less than 150 mPa·s.

(6) A brushless motor disclosed herein includes: the rotor according to any of (1) to (5) described above; a cylindrical stator having a coil, the stator having, in a center thereof, a space where the rotor is placed; a shaft configured to rotate together with the rotor in an integrated manner; and a housing the rotor and the stator.

According to the rotor and brushless motor of the disclosure, the groove-shaped adhesive admission portion is provided, recessed in a straight line along the entire length of the rotor core in the axial direction. Accordingly, the supply of the adhesive with low viscosity to the adhesive admission portion allows filling the entire adhesive allowance with the adhesive. Hence, even in a case of a rotor having a thick laminate, it is possible to avoid nonuniform adhesive application and increase the quality of a rotor and brushless motor with a simple configuration.

DESCRIPTION OF THE EMBODIMENTS

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A rotor and a brushless motor as an embodiment are described with reference to the drawings. The embodiment illustrated below is a mere exemplification, and does not aim at excluding various modifications and technology applications, which are not explicitly specified in the following embodiment. Configurations of the embodiment can be modified in various manners and implemented within the scope that does not depart from the gist of the configurations. Moreover, the configurations can be selected for use if necessary, or can be combined as appropriate.

1. Configuration

Figure 1:
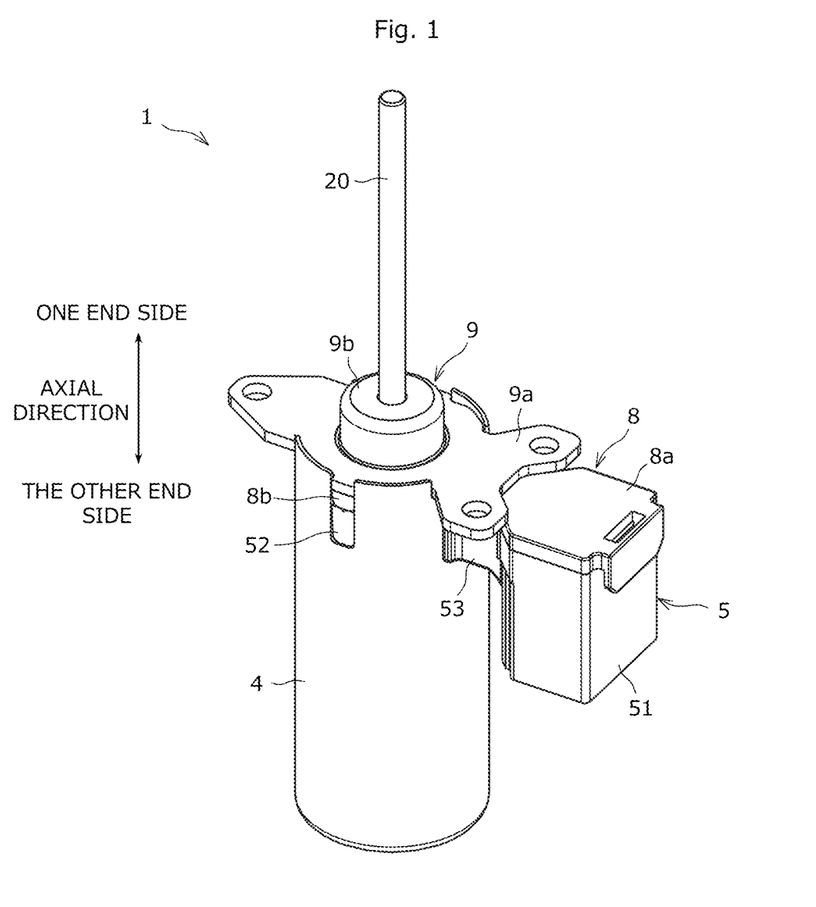
FIG. 1 is a perspective view illustrating a brushless motor according to an embodiment.
Figure 2:
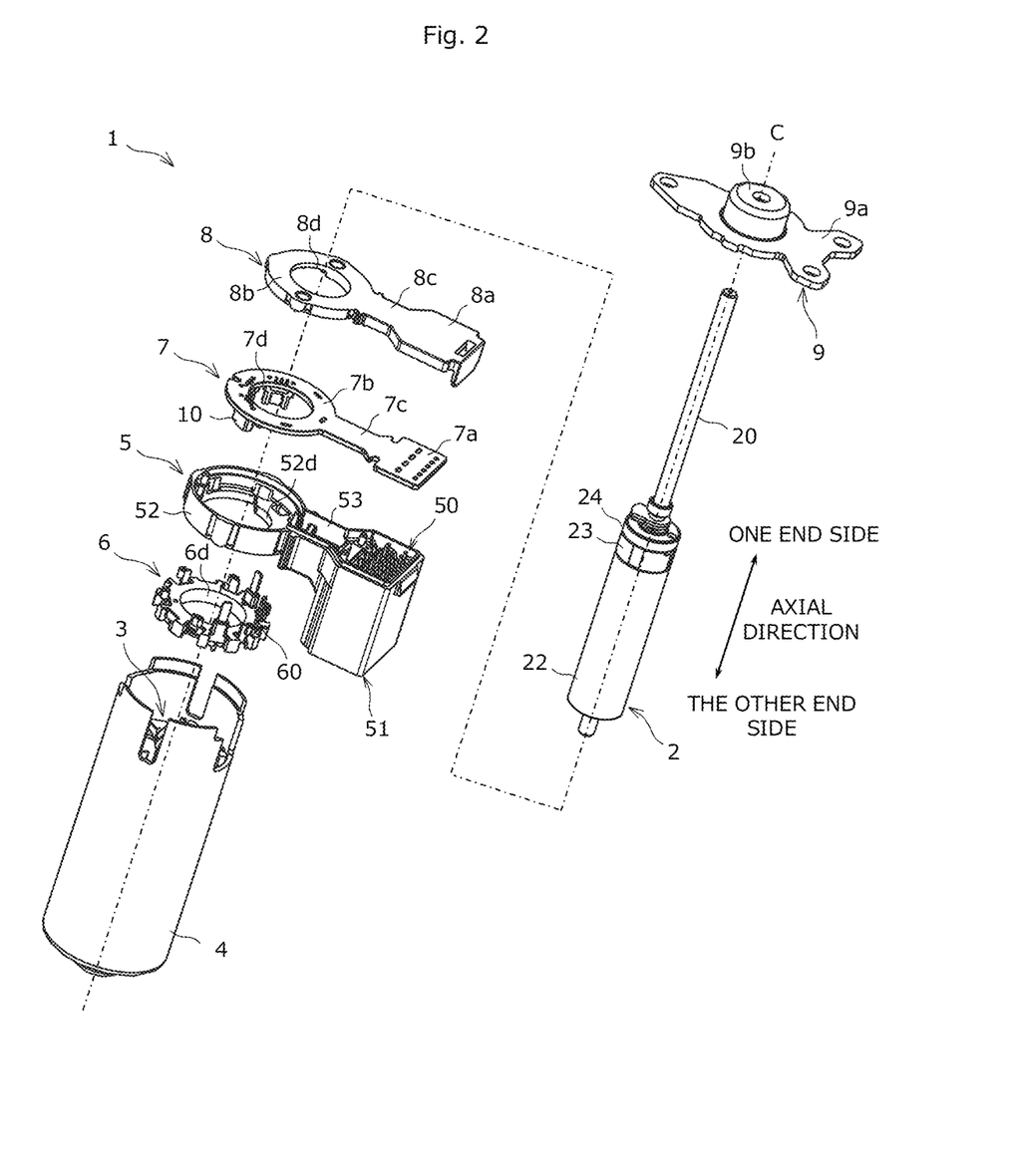
FIG. 2 is an exploded perspective view of the brushless motor illustrated in FIG. 1.
Figure 3:
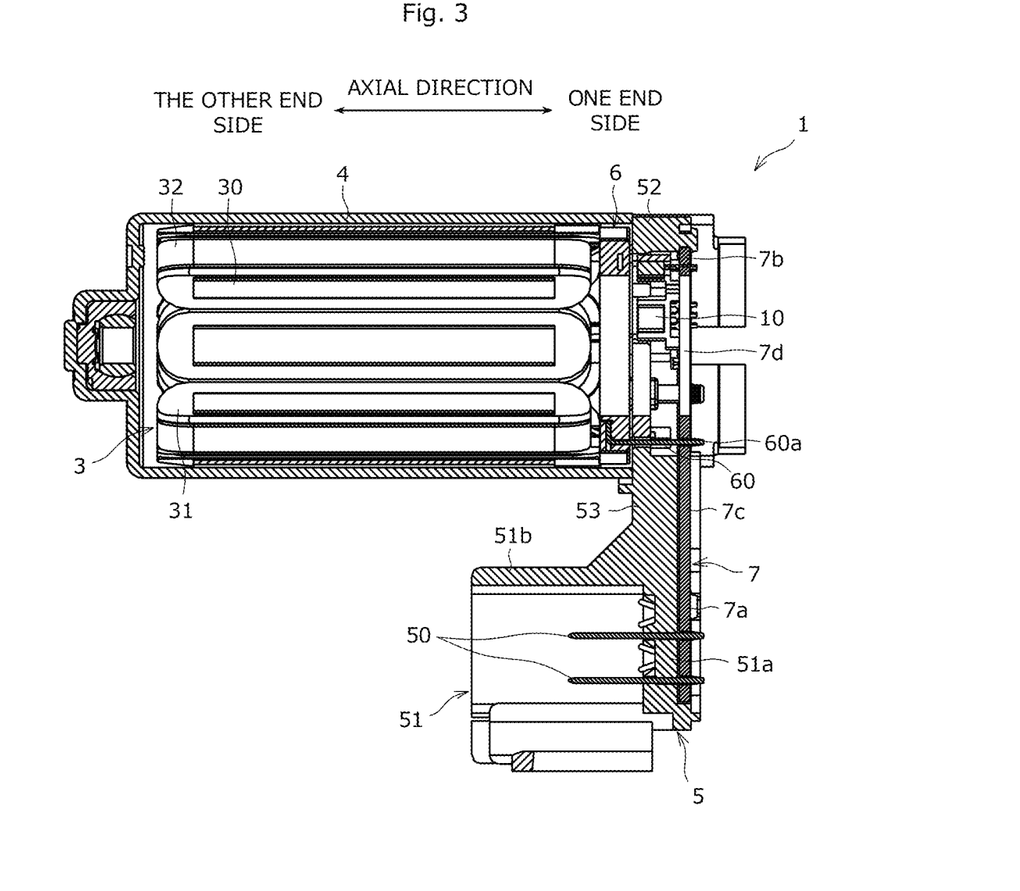
FIG. 3 is a cross-sectional view taken along an axial direction of the brushless motor illustrated in FIG. 1, and illustrates the brushless motor, omitting a rotor, a shaft, a small case plate, and a cover.
Figure 4:
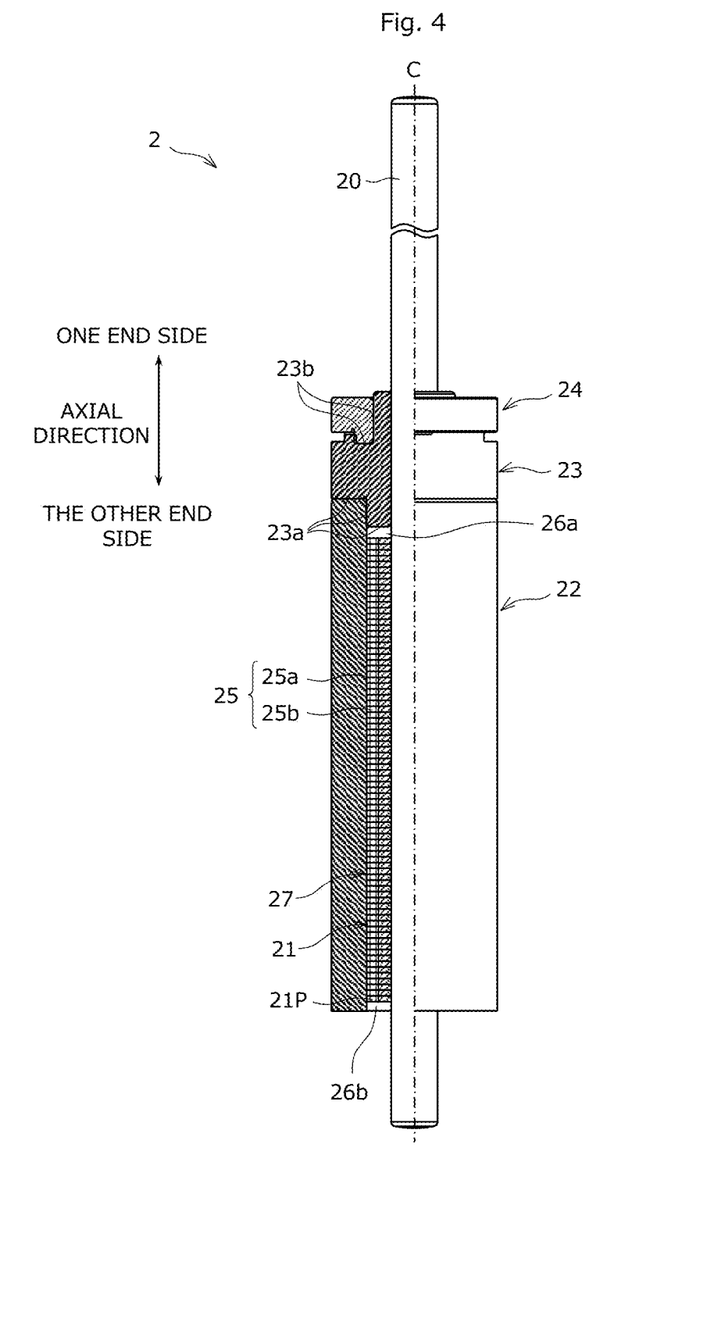
FIG. 4 is a half cross-sectional view illustrating the rotor according to the embodiment.
Figure 5:
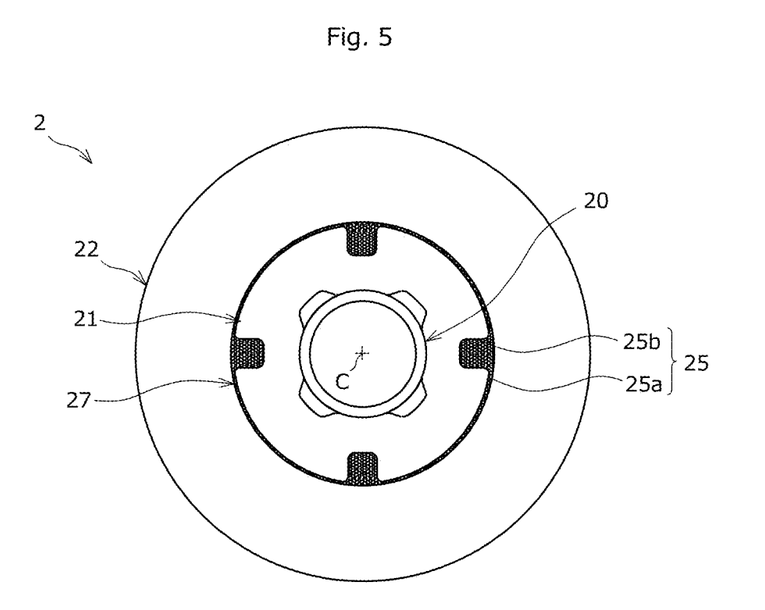
FIG. 5 is a diagram of the other end side of the rotor illustrated in FIG. 4 in an axial direction thereof as viewed in the axial direction.
Figure 6:
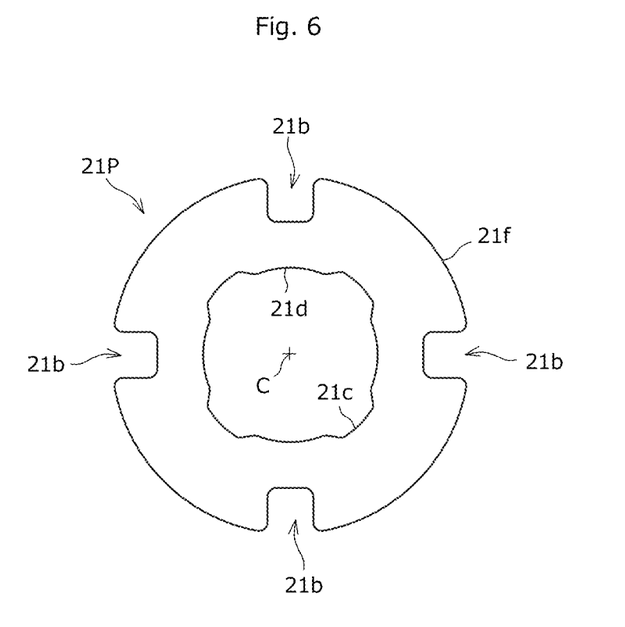
FIG. 6 is a diagram of a core piece configuring a rotor core of the rotor illustrated in FIG. 4 as viewed in the axial direction.
Figure 7:
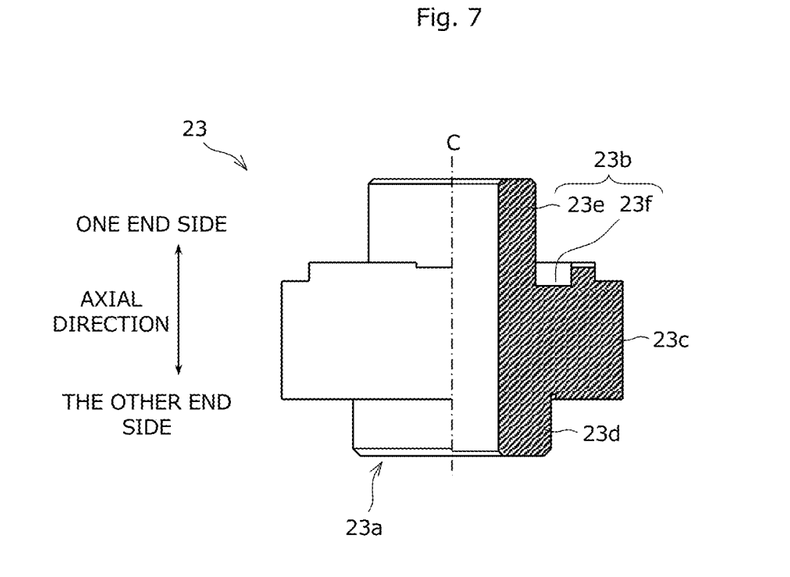
FIG. 7 is a half cross-sectional view of a bush included in the rotor of FIG. 4.

FIG. 1 is a perspective view illustrating a brushless motor 1 (hereinafter referred to as "motor 1") according to the embodiment. FIG. 2 is an exploded perspective view of the motor 1. FIG. 3 is a cross-sectional view taken along an axial direction of the motor 1, and illustrates the motor 1, omitting a rotor 2, a shaft 20, a small case plate 9, and a cover 8, which are described below. FIGS. 4 and 5 illustrate the rotor 2 according to the embodiment. FIGS. 6 and 7 each illustrate a component configuring the rotor 2.

As illustrated in FIGS. 1 to 3, the motor 1 is an inner rotor brushless motor where the rotor 2 is placed in the center of a cylindrical stator 3. In the embodiment, the small-diameter motor 1 with a diameter of 30 mm (ϕ30) and with six slots is exemplified. The motor 1 includes the columnar rotor 2 having a cylindrical magnet 22, the stator 3 having coils 32, and the shaft 20 that rotates together with the rotor 2 in an integrated manner. The motor 1 is configured in such a manner as to house the rotor 2 and the stator 3 in a metal housing 4 that forms an outer hull of the motor 1.

As illustrated in FIG. 2, the motor 1 of the embodiment includes a bus bar unit 6, a small case 5, a printed board 7 (hereinafter referred to as "board 7"), the cover 8, the rotor 2, and the small case plate 9, which are assembled in the axial direction to the housing 4 where the stator 3 is integrated. They are described below in turn.

As illustrated in FIGS. 1 and 2, the housing 4 has a bottomed tubular shape that is open on one end side in the axial direction. The small case plate 9 is fixed to the opening on the one end side, and the shaft 20 is provided in such a manner as to protrude from the opening. The external shape of the housing 4 of the embodiment is, but not limited to, cylindrical.

As illustrated in FIG. 3, the stator 3 is a substantially cylindrical component having, on an inside diameter side, a space where the rotor 2 is placed, and includes an annular stator core 30 fixed in the housing 4, and the coils 32 wound around the stator core 30 via insulators 31. The motor 1 of the embodiment is provided with six coils 32. A U-phase current is supplied to two coils 32. A V-phase current is supplied to another two coils 32. A W-phase current is supplied to the remaining two coils 32.

As illustrated in FIGS. 2 and 3, the bus bar unit 6 is an annular component placed on the one end side of the stator 3 in the axial direction, and includes three bus bars 60. The bus bar 60 is a conductive flat plate member that connects the three phase coils 32 provided to the stator 3 on a phase-by-phase basis. The bus bar unit 6 is provided as an insert molded product obtained by molding the bus bars 60, which have arc shape as viewed in the axial direction, with resin. End portions 60a of the bus bars 60 are provided, exposed from the resin. The bus bar unit 6 includes, in a center thereof, a circular hole portion 6d concentric with a central axis C of the motor 1.

As illustrated in FIGS. 1 to 3, the small case 5 is a component formed of insulating material (such as resin), and includes a bottomed tubular connector portion 51 that is placed adjacent to the housing 4, a tubular portion 52 placed on the one end side of the stator 3 in the axial direction, and a coupling portion 53 that connects the connector portion 51 and the tubular portion 52, as an integral whole. The connector portion 51 has a substantially square tubular outer shape, and is provided in such a manner that the longitudinal direction (central axis direction) is parallel to the central axis C of the motor 1. A bottom portion 51a of the connector portion 51 of the embodiment is located on a side opposite to a bottom portion of the housing 4 (on the one end side). In other words, the housing 4 is open toward the one end side, and the connector portion 51 is open toward the other end side.

As illustrated in FIG. 3, a plurality of connector terminals 50 penetrates the bottom portion 51a of the connector portion 51, and is fixed to the bottom portion 51a. The connector terminal 50 is placed, exposed, in an internal space surrounded by four side surface portions 51b of the connector portion 51. The connector terminals 50 include a terminal for power supply and a terminal for an operation signal, and enable input of power and an operation signal from the outside. In the embodiment, each connector terminal 50 is fixed by caulking to a fixing hole provided to the bottom portion 51a of the connector portion 51 in such a manner as to penetrate the bottom portion 51a. Consequently, the plurality of connecter terminals 50 can be easily fixed to the connector portion 51 with the connector terminals 50 in close proximity to each other.

As illustrated in FIG. 2, the tubular portion 52 of the connector portion 51 has a bottomed cylindrical outer shape. The tubular portion 52 is housed near the opening of the housing 4 on the one end side in an attitude of orienting a bottom portion of the tubular portion 52 toward the stator 3. A circular hole portion 52d concentric with the central axis C of the motor 1 is provided in the center of the bottom portion of the tubular portion 52. As illustrated in FIG. 3, the above bus bar unit 6 is placed between the tubular portion 52 and the stator 3 in the axial direction.

As illustrated in FIG. 2, the coupling portion 53 of the connector portion 51 is a substantially square U-shaped portion in cross section, which is provided, extending radially outward from the tubular portion 52, and connected to the connector portion 51. A part of a side surface portion of the tubular portion 52 is cut out in the place of the coupling portion 53. A space surrounded by the side surface portion of the tubular portion 52 communicates with a space surrounded by the square U shape of the coupling portion 53. The board 7 is placed in these spaces.

As illustrated in FIGS. 2 and 3, the board 7 is a component that electrically connects the end portions 60a of the bus bars 60 to the connector terminals 50 penetrating the bottom portion 51a. The board 7 is placed, stretching from the one end side of the stator 3 in the axial direction to the bottom portion 51a side of the connector portion 51. A pattern including a sensor line for taking a Hall signal out, a power line, and a ground line, in addition to output lines of U, V, and W phases, is placed on the board 7. The board 7 of the embodiment has a flush flat plate shape, and is placed on the one end side of the small case 5.

The board 7 of the embodiment includes a substantially rectangular terminal connection portion 7a to which the connector terminals 50 are connected, an annular ring portion 7b including a hole portion 7d in a center thereof, and a connection portion 7c in a straight line that connects the terminal connection portion 7a and the ring portion 7b, as viewed in the axial direction. The terminal connection portion 7a is housed in the connector portion 51. The ring portion 7b is housed in the tubular portion 52. The connection portion 7c is housed in the coupling portion 53. A Hall sensor 10 that detects the rotational position of the rotor 2 is attached to the ring portion 7b of the board 7.

As illustrated in FIGS. 1 and 2, the cover 8 is an insulating component that is attached to the small case 5 from the one end side in the axial direction, and blocks the openings of the small case 5. The cover 8 has substantially the same shape as the outer shape (outer edge portion) of the small case 5 on the one end side as viewed in the axial direction. In other words, the cover 8 includes a connector cover portion 8a that covers the connector portion 51, an annular portion 8b that covers the tubular portion 52 and includes a hole portion 8d in a center thereof, and a connection portion 8c that covers the coupling portion 53.

As illustrated in FIGS. 2 and 4, the rotor 2 includes a rotor core 21 that rotates together with the shaft 20 in an integrated manner, and a resin magnet 22 that rotates together with the rotor core 21 in an integrated manner. The shaft 20 is a rotary shaft that supports the rotor 2, and also functions as an output shaft that takes the output (mechanical energy) of the motor 1 out. The shaft 20 of the embodiment is rotatably supported by the bottom portion of the housing 4 and the small case plate 9 via bearings provided in two locations across the rotor core 21.

The rotor core 21 is configured by laminating a plurality of annular thin plate-shaped metal core pieces 21P in the axial direction. All the core pieces 21P have the same shape. As illustrated in FIG. 6, the core piece 21P of the embodiment has a substantially annular shape having a through-hole in a center thereof, and includes four indentation portions 21b that are recessed into an outer edge portion 21f, spaced uniformly in a circumferential direction of the core piece 21P. The indentation portion 21b is a portion that serves as an adhesive admission portion 25b described below. Four indentation portions 21b are placed at intervals of 90 degrees on the core piece 21P of the embodiment. The indentation portion 21b has a substantially rectangular shape of which corners are formed into a curved surface as viewed in the axial direction.

The through-hole in the center of the core piece 21P is configured, including a circular hole portion 21d concentric with the central axis C of the motor 1, and four notches 21c recessed radially outward from the hole portion 21d. As illustrated in FIG. 5, the shaft 20 is inserted through the hole portion 21d. The notch 21c is an air gap for dampening pressure upon the insertion of the shaft 20. The notches 21c are also spaced uniformly in the circumferential direction. The four notches 21c and the four indentation portions 21b are provided to the core piece 21P of the embodiment, displaced 45 degrees with respect to each other in the circumferential direction. Consequently, the path of a magnetic flux is secured without making the radial dimension of the core piece 21P too small.

The core piece 21P is produced by press blanking. The thickness (axial dimension) of the core piece 21P is less than 1 mm (for example, approximately 0.3 to 0.5 mm). Dozens of (for example, 30 to 80) the core pieces 21P are laminated and adhered together to form the rotor core 21 illustrated in FIG. 4. The laminate thickness (axial dimension) of the rotor core 21 is preferably equal to or greater than 10 mm and equal to or less than 40 mm. If, for example, 80 core pieces 21P with a thickness of 0.5 mm are laminated, then the rotor core 21 has a laminate thickness of 40 mm.

As illustrated in FIGS. 4 and 5, the rotor 2 includes the groove-shaped adhesive admission portions 25b provided in straight lines along the entire length of the rotor core 21 in the axial direction, the adhesive admission portions 25b being recessed into an outer peripheral surface of the rotor core 21 (a surface where the outer edge portions 21f are arranged). The indentation portions 21b of the core pieces 21P are aligned to form the adhesive admission portion 25b. The adhesive admission portion 25b is open on both of the one and the other end side of the rotor core 21 in the axial direction. The adhesive admission portion 25b is a portion into which an adhesive 27 that bonds and fixes the rotor core 21 and the magnet 22 flows. In the rotor 2 of the embodiment, four adhesive admission portions 25b are spaced uniformly in the circumferential direction. The magnet 22 is mounted on the outer peripheral surface of the rotor core 21 via a gap 25a.

As illustrated by a hatched pattern in FIG. 5, the adhesive 27 is filled in an entire adhesive allowance 25 including both of the gap 25a and the adhesive admission portions 25b between the outer peripheral surface of the rotor core 21 and an inner peripheral surface of the magnet 22. In other words, the space of the adhesive allowance 25 is fully filled with the adhesive 27. The volume of the adhesive 27 relative to the volumetric capacity of the adhesive allowance 25 is approximately 100%. The viscosity of the adhesive 27 of the embodiment is equal to or greater than the viscosity of water and equal to or less than 150 mPa·s, preferably equal to or less than 100 mPa·s. In other words, the low-viscosity, or super-low-viscosity, adhesive 27 is used for the rotor 1 of the embodiment.

Consequently, the adhesive 27 that has been poured into the adhesive admission portions 25b is distributed uniformly throughout the adhesive allowance 25, and hardened. Accordingly, the rotor core 21 and the magnet 22 are fixed together without a gap. In the motor 1 of the embodiment, spaces 26a and 26b where the adhesive 27 collects (hereinafter referred to as "adhesive chambers 26a and 26b") are provided at both ends of the rotor core 21 in the axial direction. The adhesive allowance 25 is open to the two adhesive chambers 26a and 26b.

As illustrated in FIGS. 2 and 4, the rotor 2 of the embodiment further includes a bush 23 fixed to the rotor core 21 and the magnet 22 on the one end side, and a sensor magnet 24 that is fixed to the bush 23 on the one end side and rotates together with the shaft 20 in an integrated manner. The bush 23 is a resin component including a prevention surface 23a that blocks the gap 25a on the one end side and prevents the run-off of the adhesive 27, and a holding portion 23b that holds the sensor magnet 24. The sensor magnet 24 is placed, facing the Hall sensor 10 in the radial direction. Consequently, the Hall sensor 10 detects the rotation of the sensor magnet 24.

As illustrated in FIG. 7, the bush 23 of the embodiment is formed into a shape where three substantially cylindrical portions (cylindrical portions) of which outside diameters are different are lined in the axial direction. A cylindrical portion 23c located in the middle in the axial direction has the largest outside diameter dimension. A cylindrical portion 23e with the smallest outside diameter dimension is provided on the one end side of the cylindrical portion 23c. A cylindrical portion 23d with the second largest outside diameter dimension is provided on the other end side of the middle cylindrical portion 23c. As illustrated in FIG. 4, the other end side of the cylindrical portion 23d is a portion that fits into a radially inner side of the magnet 22 on the one end side. A surface facing the other end side and outer peripheral surface of the cylindrical portion 23d, and a step surface function as the above prevention surface 23a. Moreover, a mating portion 23f where a portion on the other end side of the sensor magnet 24 fits is provided, recessed into a surface, which faces the one end side, of the cylindrical portion 23c. The mating portion 23f and the cylindrical portion 23e on the one end side function as the above holding portion 23b.

As illustrated in FIG. 2, in the motor 1 of the embodiment, the bus bar unit 6, the small case 5, the board 7, and the cover 8 are attached in this order to the stator 3 housed in the housing 4. All of the hole portion 6d of the bus bar unit 6, the hole portion 52d of the small case 5, the hole portion 7d of the board 7, and the hole portion 8d of the cover 8 coincide with each other. The shaft 20 is inserted through the hole portions 6d, 52d, 7d and 8d. In the motor 1 of the embodiment, all of the diameters of the hole portions 6d, 52d, 7d, and 8d are greater than the outside diameter of the rotor 2. Consequently, it is possible to insert the rotor 2 integrated with the shaft 20 into the housing 4 (the stator 3) after four elements 6, 5, 7, and 8 are assembled to the housing 4.

As illustrated in FIGS. 1 and 2, the small case plate 9 is a metal component that is mounted on the one end side of the cover 8, and is fixed to the housing 4. The small case plate 9 of the embodiment includes a flat portion 9a that is mounted on a surface on the one end side of the cover 8, and a bulging portion 9b that is formed into a bottomed tubular shape on the flat portion 9a with the central axis C as the center. The bulging portion 9b is a portion that houses an unillustrated bearing.

2. Effects (1) In the above-mentioned rotor 2 and motor 1, the adhesive admission portions 25b are provided to the outer peripheral surface of the rotor core 21 along the entire length of the rotor core 21 in the axial direction. Accordingly, even if the laminate of the rotor 2 is thick, the supply of the low-viscosity adhesive 27 to the adhesive admission portions 25b enables filling the entire adhesive allowance 25 with the adhesive 27. In other words, nonuniform application of the adhesive 27 for fixing the rotor core 21 and the magnet 22 can be avoided with a simple configuration. Consequently, even if the material of the rotor core 21 and the material of the magnet 22 are different, it is possible to avoid a crack caused during high-speed rotation of the rotor 2 or by thermal expansion and contraction and to increase the quality of the rotor 2.

(2) According to the above-mentioned rotor 2 and motor 1, a plurality of the adhesive admission portions 25b is spaced uniformly in the circumferential direction of the rotor core 21. Accordingly, the adhesive 27 can be supplied to the plurality of the adhesive admission portions 25b and filled more uniformly. Therefore, it is possible to further increase the quality of the rotor 2.

(3) In the above-mentioned rotor 2 and motor 1, the core piece 21P is produced by press blanking. Accordingly, the thickness of the core piece 21P is less than 1 mm (for example, approximately 0.35 to 0.5 mm). The rotor core 21 is configured by laminating the core pieces 21P. If the thickness of the laminate is equal to or less than 40 mm, then the rotor 2 can be inserted after the stator 3, the bus bars 60, and the like are placed in the housing 4 of the small-diameter motor 1 with a small diameter, for example, approximately ϕ30 mm Consequently, it is possible to prevent damage to the rotor 2, and reduce equipment constraints during assembly. Moreover, in the small-diameter motor 1 with approximately ϕ30 mm, an upper limit to the laminate thickness of the stator core 30 is approximately 40 mm A thickness greater than approximately 40 mm makes it difficult to stack the core pieces 21P, and a stacking error also becomes conspicuous. Moreover, the housing 4 is produced by drawing in many cases. If the housing 4 with approximately ϕ30 mm is produced by drawing, an upper limit to the depth is approximately 50 mm. On the other hand, each end portion of the coil 32 in the axial direction (an upper coil end and a lower coil end) requires approximately 5 mm Again, an upper limit to the laminate thickness of the stator core 30 is 40 mm. In this manner, since the upper limit to the laminate thickness of the stator core 30 is 40 mm, an upper limit to the laminate thickness of the rotor core 21 placed inside the stator core 30 is also 40 mm. In other words, if the laminate thickness of the rotor core 21 is set at 40 mm or less, it is possible to improve assemblability and reduce the manufacturing cost, and reduce the stacking error of the rotor core 21.

Furthermore, in the above-mentioned rotor 2 and motor 1, the laminate thickness of the rotor core 21 is set at 10 mm or greater. As described above, each end portion of the coil 32 in the axial direction (the upper coil end and the lower coil end) requires approximately 5 mm, and a total of approximately 10 mm is required. In relation to the coil ends of which total length is approximately 10 mm, at least substantially the same extent (approximately 10 mm) is secured for a laminate thickness contributing to a magnetic flux as the motor 1. Accordingly, high torque relative to the total motor length and the motor volume can be secured. Hence, a lower limit to the laminate thickness of the stator core 30 is 10 mm A lower limit to the laminate thickness of the rotor core 21 placed in the stator core 30 is also 10 mm. In other words, if the laminate thickness of the rotor core 21 is set at 10 mm or greater, then the small-diameter motor 1 to which the rotor 2 is applied can output higher torque than the existing brushed motor of the same size.

(4) According to the above-mentioned rotor 2 and motor 1, one bush 23 has the function of preventing the run-off of the adhesive 27 and the function of holding the sensor magnet 24. Accordingly, it is possible to achieve reductions in the number of components, cost, and size.

(5) According to the above-mentioned rotor 2 and motor 1, the adhesive 27 with a low viscosity of equal to or greater than the viscosity of water and equal to or less than 150 mPa·s is used. Accordingly, the adhesive 27 can be applied uniformly to the entire adhesive allowance 25. Consequently, it is possible to further increase the quality of the rotor 2.

(6) In the motor 1 of the embodiment, all of the diameters of the hole portion 52d of the tubular portion 52 of the small case 5, the hole portion 7d of the ring portion 7b of the board 7, and the hole portion 8d of the cover 8 are greater than the outside diameter of the rotor 2. Accordingly, the rotor 2 can be incorporated after these three elements are assembled to the housing 4. Hence, it is possible to prevent damage to the rotor 2, and reduce equipment constraints during assembly. Therefore, it is possible to improve assemblability and reduce the manufacturing cost.

3. Others

The configuration of the rotor 2 described in the above-mentioned embodiment is an example, and the configuration of the rotor 2 is not limited to the above-mentioned configuration. For example, a holding component that holds the sensor magnet 24 and a component that prevents the run-off of the adhesive 27 may be placed instead of the bush 23. Moreover, the above viscosity of the adhesive 27 is also an example, and the viscosity of the adhesive 27 is not limited to the above viscosity.

In the above rotor 2, the four adhesive admission portions 25b are spaced uniformly in the circumferential direction. However, it is simply required to provide one or more adhesive admission portions 25b, and the one or more adhesive admission portions 25b may not be spaced uniformly. Moreover, the above rotor core 21 is provided with the notches 21c. However, the notches 21c may be omitted. The laminate thickness of the rotor core 21 is also an example. A rotor core outside the above range (10 mm laminate thickness 40 mm) may be employed.

Moreover, the above-mentioned configuration of the motor 1 is also an example. The configuration of the motor 1 is not limited to the above-mentioned configuration. For example, the connector portion 51 may be open toward the one end side in the axial direction, or may be open in the radial direction. Moreover, the method for fixing the plurality of connector terminals 50 is not limited to caulking. Another fixing method such as bonding may be employed. The small case 5 (the connector portion 51) and the cover 8 may be omitted.

Moreover, the shape and material of the small case plate 9 are not limited to those described above. In the above motor 1, the configuration where the rotor 2 is inserted after the bus bar unit 6, the small case 5, the board 7, and the cover 8 are attached to the housing 4 is exemplified. However, the rotor 2 may be inserted first, and then the elements may be assembled. In this case, the diameters of the hole portions 6d, 52d, 7d, and 8d may be equal to or less than the outside diameter of the rotor 2.

The attachment position and orientation of the Hall sensor 10 are not limited to those described above. For example, the Hall sensor 10 may be attached to the board 7 in such a manner as to detect rotation from the axial direction of the rotor 2. The Hall sensor 10 itself may be omitted. Moreover, the bus bars 60 may not be molded with resin. The board 7 may not have a flush flat plate shape. The connector terminals 50 may be connected to the end portions 60a of the bus bars 60 without using the board 7.

The above-mentioned size of and number of poles of the motor 1 are examples. The motor 1 may be, for example, a motor of a small diameter, for example, ϕ27 to ϕ36. The above rotor 2 can also be applied to a motor other than a small-diameter motor.

What is claimed is:

1. A rotor applied to an inner rotor brushless motor, comprising:
   a rotor core including a laminate of a plurality of annular thin plate-shaped core pieces, the rotor core being configured to rotate together with a shaft in an integrated manner;
   a cylindrical resin magnet mounted on an outer peripheral surface of the rotor core via a gap;
   a groove-shaped adhesive admission portion in a straight line along the entire length of the rotor core in an axial direction thereof, the adhesive admission portion being recessed into the outer peripheral surface of the rotor core;
   an adhesive configured to bond and fix the rotor core and the resin magnet;
   a bush fixed to the rotor core and the resin magnet on one end side in the axial direction; and
   a sensor magnet fixed to the bush on the one end side, the sensor magnet being configured to rotate together with the shaft in an integrated manner, wherein
   the adhesive is filled in an entire adhesive allowance including both of the gap and the adhesive admission portion between the outer peripheral surface of the rotor core and an inner peripheral surface of the resin magnet, and
   the bush includes a prevention surface that blocks the gap on the one end side to prevent run-off of the adhesive, and a holding portion that holds the sensor magnet.

2. The rotor according to claim 1, wherein a plurality of the adhesive admission portions is spaced uniformly in a circumferential direction of the rotor core.

3. The rotor according to claim 1, wherein the core piece is produced by press blanking, and the thickness of the laminate of the rotor core is equal to or greater than 10 mm and equal to or less than 40 mm.

4. The rotor according to claim 1, wherein the viscosity of the adhesive is equal to or greater than the viscosity of water and equal to or less than 150 mPa·s.

5. A brushless motor comprising:
   a rotor including
     a rotor core including a laminate of a plurality of annular thin plate-shaped core pieces, the rotor core being configured to rotate together with a shaft in an integrated manner;
     a cylindrical resin magnet mounted on an outer peripheral surface of the rotor core via a gap;
     a groove-shaped adhesive admission portion in a straight line along the entire length of the rotor core in an axial direction thereof, the adhesive admission portion being recessed into the outer peripheral surface of the rotor core;
     an adhesive configured to bond and fix the rotor core and the resin magnet;
     a bush fixed to the rotor core and the resin magnet on one end side in the axial direction; and
     a sensor magnet fixed to the bush on the one end side, the sensor magnet being configured to rotate together with the shaft in an integrated manner;
   a cylindrical stator including a coil, the stator having, in a center thereof, a space where the rotor is placed;
   a shaft configured to rotate together with the rotor in an integrated manner; and
   a housing the rotor and the stator, wherein the adhesive is filled in an entire adhesive allowance including both of the gap and the adhesive admission portion between the outer peripheral surface of the rotor core and an inner peripheral surface of the resin magnet, and the bush includes a prevention surface that blocks the gap on the one end side to prevent run-off of the adhesive, and a holding portion that holds the sensor magnet.

\* \* \* \* \*